Jan. 31, 1956
Y. A. GODON
2,732,651
COMBINED FISHHOOK AND GAFF
Filed Sept. 22, 1953
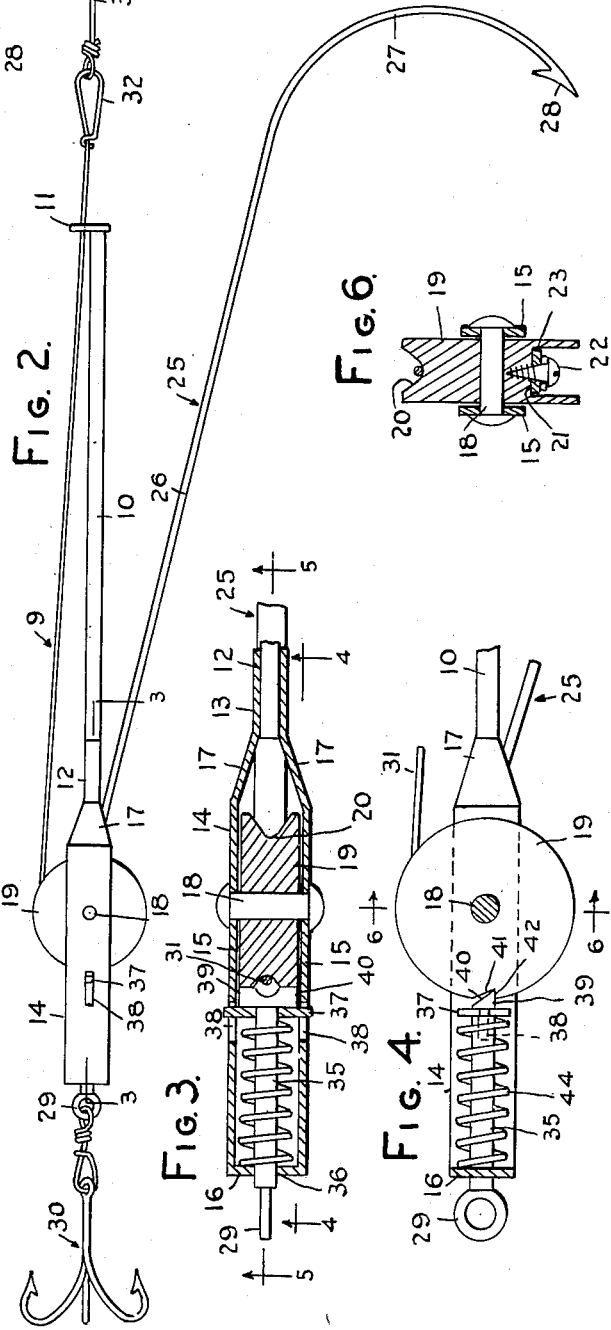
INVENTOR
YVAN A. GODON
BY
McMorrow, Berman & Davidson
ATTORNEYS

United States Patent Office 2,732,651
Patented Jan. 31, 1956

2,732,651

COMBINED FISHHOOK AND GAFF

Yvan A. Godon, Edmonton, Alberta, Canada

Application September 22, 1953, Serial No. 381,572

1 Claim. (Cl. 43—37)

This invention relates to an improved combined fish hook and gaff of the type wherein the gaff component is actuated to gaff a fish by the pull of the fish on the fish hook component.

An important object of the invention is to provide a novel device of the character indicated above which is especially suited to troll fishing, and which works easily through the water due to its compact cross section and lack of hindering protruberances.

Other important objects and advantageous features of the invention will be apparent from the following description and the accompanying drawings, wherein, for illustrative purposes only, a specific form of the invention is set forth in detail.

In the drawings:

Figure 1 is a top plan view;

Figure 2 is a side elevation, the gaff component being in retracted position;

Figure 3 is an enlarged fragmentary horizontal section taken on the line 3—3 of Figure 2;

Figure 4 is a fragmentary vertical longitudinal section taken on the line 4—4 of Figure 3;

Figure 5 is a similar view taken on the line 5—5 of Figure 3;

Figure 6 is a transverse vertical section take on the line 6—6 of Figure 4; and

Figure 7 is a fragmentary bottom plan view of Figure 6.

Referring in detail to the drawings, wherein like numerals designate like parts throughout the several views, the illustrated combined hooking and gaffing device, generally designated 9, comprises a preferably stainless steel round rigid shaft 10 having on its rearward end a lateral leader guide eye 11. The forward end 12 of the shaft 10 is inserted in and secured by suitable means in a reduced diameter ferrule portion or sleeve 13 on the rearward end of an elongated frame 14.

The frame 14 comprises a pair of parallel spaced longitudinal side bars 15, 15 which are connected and spaced at their forward ends by a cross bar 16. Converging rear end portions 17, 17 of the side bars 15, 15 are joined to or integral with the forward end of the sleeve 13.

The side bars 15, 15 are apertured near the converging portions 17, 17 to pass a headed pin or shaft 18 which carries a pulley 19 between the side bars 15, 15 and which has a peripheral groove 20. The pulley 19 has a flat chordal area 21 on one side of its periphery, and along the area 21 is secured, as by screws 22, a flat bar portion or heel portion 23 on the normally forward end of a gaff 25. The gaff 25 is located in a longitudinal plane passing centrally and vertically through the shaft 10 and the leader guide eye 11 and swings forwardly and rearwardly on the axis of the pulley 19.

The gaff 25 includes a straight rod portion 26 terminating at one end of the heel portion 23 and at its other end in a downwardly and forwardly curved crook 27 terminating at its free end in two closely spaced barbs 28, 28.

Positioned forwardly of the frame cross bar 16 is an eye 29 to which is swingably secured a gang hook 30.

A leader 31 is passed forwardly through the guide eye 11 along the upper side of the shaft 10, is trained forwardly and downwardly around the pulley 19 in its groove 20, and has its forward end anchored to the flat area 21 of the pulley 19 under one of the screws 22, as shown in Figure 5. The leader 31 has means 32 on its rearward end for connection to a fishing line 33, whereby the device is drawn through the water, as in trolling.

From the foregoing, it is evident that with the leader 31 held taunt or nearly so, by pull upon the fishing line 33, a fish taking the gang hook 30 and pulling forwardly thereon will cause the body of the device, composed of the shaft 10 and the frame 14 to move forwardly relative to the leader 31 and thereby cause the pulley 19 to turn clockwise, in Figure 2, so as to swing the gaff 25 upwardly and forwardly and impale the barbed points 28 into the fish and gaff the fish to the device.

In order to provide against vagrant movement of the gaff 25 from its normal rearwardly extending starting position, illustrated in Figure 2, a releasable latching mechanism is provided which comprises a pin or plunger 35 which is slidably engaged through a hole 36 provided in the cross bar 16, and extends rearwardly therefrom and between the side bars 15, 15 of the frame 14. A cross head 37 on the pin 35 near its rearward end slides in longitudinal slots 38, 38 provided in the side bars 15, 15 forwardly of the pulley 19. The latching pin 35 terminates at its rearward end in a latch head 39 which is bevelled on one side thereof, as indicated at 40, so as to conformably engage the bevelled trailing sides 41 of notches 42, 42 provided in the periphery of the pulley 19 at opposite sides of its groove 20. The notches 42, 42 are located in spaced trailing relation to the flattened area 21 of the pulley 19, so that when the latch head 39 is engaged in the notches 42, 42, the pulley 19 is held in a position in which the gaff 25 is in its normal trailing position.

The latching pin 35 has the above mentioned gang hook attaching eye 29 on its forward end, so that forward unlatching movement of the pin 35 accompanies a forward pull on the gang hook 30. This movement of the pin 35 is yieldably resisted by a helical spring 44 which is circumposed on the pin 35 and is compressed between the cross bar 16 and the cross head 37. The spring 44 also serves to return the pin 35 rearwardly to latching position and ordinarily maintains the latch head 39 engaged with the pulley notches 42, 42. Until the latch head 39 is withdrawn from the pulley notches 42, 42 by a sufficiently forceful forward pull upon the gang hook 30, the pulley cannot turn in a clockwise direction and bring the gaff forwardly and upwardly into gaffing position. It is obvious that with pull removed from the gang hook 30, the gaff 25 can be returned to latched and trailing position simply by swinging the gaff rearwardly and downwardly relative to the frame 14 until the latch head enters the pulley notches 42, 42.

What is claimed is:

In a combined fish hooking and gaffing device, an elongated open frame having a length substantially greater than its width, said frame comprising a pair of laterally spaced side bars having forward ends and rear end portions, a cross bar extending between and secured to the forward ends of the side bars, said rear end portions converging rearwardly, an elongated rigid shaft having forward and rearward ends, said shaft having its forward end engaged between and secured to the converging rear end portions of the frame side bars, a pin secured to and extending between said side bars at a point forward of and near to said converging rear end portions of the side bars, a pulley journaled on said pin between the side bars, said pulley having a peripheral edge, a leader guide on the rearward end of the shaft, a leader extending forwardly through said guide and having a forward end portion trained around and secured to the peripheral edge of the pulley, a gaff having a normally forward end fixed to the pulley and projecting therefrom, said gaff having a normally rearward end having a gaffing hook, said peripheral edge of the pulley having a notch, said frame cross bar having an opening, a latch pin extending through said opening in line with the pulley, said latch pin having a forward end positioned forwardly of the cross bar and having a fish hook, said latch pin having a rearward end having a latch head engageable with the pulley notch, a cross head on said latch pin located forwardly of the latch head, said cross head having ends slidably engaging the frame side bars, and a helical spring circumposed on the latch pin and compressed between said cross bar and said cross head.

References Cited in the file of this patent

UNITED STATES PATENTS

| | | |
|---|---|---|
| 896,765 | Sears | Aug. 25, 1908 |
| 1,012,528 | Doose | Dec. 19, 1911 |
| 1,175,118 | Binlas | Mar. 14, 1916 |
| 1,293,127 | Lantz | Feb. 4, 1919 |
| 1,452,630 | Walker | Apr. 24, 1923 |
| 2,162,241 | Boyce | June 13, 1939 |
| 2,466,688 | Culver | Apr. 12, 1949 |
| 2,606,386 | Seabeck | Aug. 12, 1952 |
| 2,616,212 | Cornalba | Nov. 4, 1952 |
| 2,624,150 | Jolley | Jan. 6, 1953 |